United States Patent
Wang et al.

(10) Patent No.: US 12,314,180 B2
(45) Date of Patent: May 27, 2025

(54) DATA PREFETCH METHOD AND APPARATUS, AND DEVICE

(71) Applicant: Huawei Technologies Co., Ltd., Shenzhen (CN)

(72) Inventors: Haixin Wang, Hangzhou (CN); Ruliang Dong, Hangzhou (CN); Pei Wu, Hangzhou (CN); Jianhong Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 18/344,417

(22) Filed: Jun. 29, 2023

(65) Prior Publication Data

US 2023/0350807 A1    Nov. 2, 2023

Related U.S. Application Data

(63) Continuation of application No. PCT/CN2021/142166, filed on Dec. 28, 2021.

(30) Foreign Application Priority Data

Dec. 31, 2020  (CN) .......................... 202011641633.2

(51) Int. Cl.
*G06F 12/0862* (2016.01)
*G06F 12/02* (2006.01)
*G06F 13/16* (2006.01)

(52) U.S. Cl.
CPC ...... *G06F 12/0862* (2013.01); *G06F 12/0246* (2013.01); *G06F 13/1678* (2013.01)

(58) Field of Classification Search
CPC ............ G06F 12/0862; G06F 12/0246; G06F 13/1678
See application file for complete search history.

(56) References Cited

U.S. PATENT DOCUMENTS

| | | | |
|---|---|---|---|
| 7,702,857 B2 | 4/2010 | Gill et al. | |
| 9,280,474 B2 | 3/2016 | Pavlou et al. | |
| 2015/0269027 A1* | 9/2015 | Wan | G06F 12/0893 714/6.12 |
| 2020/0327061 A1* | 10/2020 | Tan | G06F 12/0246 |
| 2021/0374523 A1* | 12/2021 | Gottin | G06N 3/088 |

FOREIGN PATENT DOCUMENTS

| | | |
|---|---|---|
| CN | 110837513 A | 2/2020 |
| CN | 110226158 B | 6/2021 |

OTHER PUBLICATIONS

Binny S. Gill et al., "AMP: Adaptive Multi-stream Prefetching in a Shared Cache," Feb. 13, 2007, total 14 pages.

* cited by examiner

*Primary Examiner* — Michael Krofcheck
*Assistant Examiner* — Janice M. Girouard
(74) *Attorney, Agent, or Firm* — Conley Rose, P.C.

(57) ABSTRACT

A data prefetch method includes before data is prefetched, a first data access request that is first obtained, and a data prefetch policy that is determined based on the first data access request and a data lifecycle such that a first data set stored in a second storage medium is stored into a first storage medium according to the data prefetch policy. The first data set includes at least one piece of data, the data prefetch policy includes at least a prefetch length, the data lifecycle indicates duration for storing data in the first storage medium, and a read/write access rate of the second storage medium is less than that of the first storage medium.

20 Claims, 3 Drawing Sheets

DATA PREFETCH METHOD AND APPARATUS, AND DEVICE

CROSS-REFERENCE TO RELATED APPLICATIONS

This is a continuation application of International Patent Application No. PCT/CN2021/142166 filed on Dec. 28, 2021, which claims priority to Chinese Patent Application No. 202011641633.2 filed on Dec. 31, 2020, both of which are hereby incorporated by reference in their entireties.

TECHNICAL FIELD

This application relates to the field of data processing technologies, and in particular, to a data prefetch method and apparatus, and a device.

BACKGROUND

Usually, a processor (for example, a central processing unit (CPU) or a graphics processing unit (GPU)) accesses different types of storage media at different rates. A high-speed cache and a main memory are used as an example. A rate at which the processor accesses data in the high-speed cache is usually far greater than a rate at which the processor accesses data in the main memory. Therefore, before performing data access, the processor may write data in the main memory into the high-speed cache. This data processing manner may be referred to as "prefetch". In this way, the processor can directly access corresponding data from the high-speed cache, to improve data access efficiency of the processor. However, according to a conventional prefetch method, usually data of a fixed length is prefetched. As a result, validity of data prefetch cannot be ensured, and data processing performance is affected. Therefore, how to provide a more efficient data prefetch method becomes an urgent technical problem to be resolved.

SUMMARY

This application provides a data prefetch method and apparatus, a device, a computer-readable storage medium, and a computer program product, to dynamically adjust, in an adaptive manner, a prefetch length for prefetching data at a single time, so that a prefetched data waste caused by prefetching excessively much data at the single time and processor performance deterioration caused by prefetching excessively little data at the single time are avoided.

According to a first aspect, a data prefetch method is disclosed. Before data is prefetched, a first data access request may be first obtained, and a data prefetch policy is determined based on the first data access request and a data lifecycle, so that a first data set stored in a second storage medium may be stored into a first storage medium according to the data prefetch policy. The first data set includes at least one piece of data, the data prefetch policy includes at least a prefetch length, the data lifecycle indicates duration for storing data in the first storage medium, and a read/write access rate of the second storage medium is less than that of the first storage medium.

The data lifecycle in the first storage medium may reflect a change status of data in the first storage medium, in other words, may reflect an interval at which the data in the first storage medium changes, in other words, may reflect a data change rule in the first storage medium. Therefore, the prefetch length calculated based on the data lifecycle can conform to the data change rule in the first storage medium, so that data of a proper length may be prefetched to the first storage medium in advance for a next data access request. In this way, a prefetch length for prefetching data at a single time is dynamically adjusted in an adaptive manner, so that not only a prefetched data waste and occupation of storage space of the first storage medium that are caused by prefetching excessively much data at the single time can be avoided as much as possible, but also low data access performance caused by prefetching excessively little data at the single time can be avoided as much as possible.

In a possible implementation, the data prefetch policy may be further determined with reference to the first data access request, the data lifecycle, and an attribute of a sequential flow to which the first data access request belongs. The sequential flow includes a plurality of data access requests with consecutive logic block addresses (LBAs), and the first data access request is any one of the plurality of data access requests with consecutive LBAs. In this way, different data prefetch policies may be determined for data access requests of different sequential flows. For example, different prefetch lengths for prefetching data at a single time may be determined for next data access requests of different sequential flows. In this way, precision of a single-time prefetch length determined for a data access request may reach a higher level. The attribute of the sequential flow may include an average data access length of a plurality of data access requests and duration that the sequential flow has lasted. The average data access length may be obtained through summing and then averaging of lengths of data requested to be accessed by using the plurality of data access requests respectively. The duration that the sequential flow has lasted is a sum of duration that a plurality of data access requests that have been currently executed last respectively.

In a possible implementation, when the data prefetch policy is determined, a start storage location of prefetched data in the second storage medium may be determined based on the first data access request, so that some data at and after the start storage location is all data prefetched at this time. In addition, a prefetch length for prefetching data may be calculated based on the data lifecycle, so that data of a preset length starting from the start storage location may be used as the prefetched data and stored into the first storage medium. In this way, data that needs to be prefetched may be determined for a next data access request based on the first data access request and the data lifecycle.

In a possible implementation, before the first data set stored in the second storage medium is stored into the first storage medium based on the prefetch policy, a prefetch length upper limit may be further obtained, in an example, a total length of data prefetched for the sequential flow does not exceed the prefetch length upper limit. In this way, when the prefetch length for prefetching data at a single time is determined, a prefetched length of the sequential flow may be obtained, and a difference between the prefetch length upper limit and the prefetched length may be calculated. Then, when the prefetch length that is for prefetching data at a single time and that is determined in the foregoing manner is greater than the difference, the prefetch length is updated to the difference. In this way, a case in which a total length prefetched for the sequential flow is excessively long due to an excessively large prefetch length at this time can be avoided, thereby reducing a prefetch waste as much as possible. Further, when the prefetch length for prefetching data at a single time is not greater than the difference, it is determined to prefetch data from the second storage medium based on the prefetch length that is for prefetching data at a single time and that is determined in the foregoing manner.

In a possible implementation, the prefetch length upper limit may be determined for the sequential flow based on an accessed data length of the sequential flow and a prefetch length base. For example, when the accessed data length of the sequential flow is less than the prefetch length base, the prefetch length upper limit of the sequential flow is the prefetch length base, when the accessed data length of the sequential flow is greater than the prefetch length base but less than twice the prefetch length base, the prefetch length upper limit of the sequential flow may be adjusted to twice the prefetch length base, when the accessed data length of the sequential flow is greater than twice the prefetch length base but less than thrice the prefetch length base, the prefetch length upper limit of the sequential flow may be adjusted to thrice the prefetch length base, and so on. Certainly, the prefetch length upper limit of the sequential flow may alternatively be determined in another manner. This is not limited in this application.

In a possible implementation, the prefetch length base may be calculated based on accessed data lengths of a plurality of sequential flows in a historical time period. When data is prefetched to the first storage medium for the plurality of sequential flows in the historical time period based on the calculated prefetch length base, a total amount of data wasted by prefetching data is the minimum. In this way, the prefetch length base may be determined, to further determine a prefetch length upper limit of the sequential flow in a current time period.

In a possible implementation, when an attribute value of the sequential flow, for example, a data access rate of the sequential flow, does not change, a prefetch length for prefetching data each time may be a same length. After the attribute value of the sequential flow changes, the prefetch length for prefetching data at a single time may be adjusted based on a changed attribute value. In this way, data prefetch may be dynamically adjusted.

In a possible implementation, the data lifecycle may be calculated based on a second data set in a preset time period. Further, an average value of duration that the second data set in the preset time period is stored in the first storage medium may be calculated, so that the average value may be used as the data lifecycle, where the second data set includes at least one piece of data. In this way, through data statistics collection and corresponding calculation, duration that data is stored in the first storage medium may be determined, that is, the data lifecycle is determined.

In a possible implementation, the data lifecycle may alternatively be calculated in real time. Further, a capacity of the first storage medium and data write bandwidth of the first storage medium may be obtained, so that the data lifecycle may be calculated based on the capacity of the first storage medium and the data write bandwidth of the first storage medium. For example, a ratio of the capacity of the first storage medium to the data write bandwidth of the first storage medium may be used as the data lifecycle.

In some possible implementations, the first storage medium is a cache, and the second storage medium is a hard disk, or the first storage medium is a main memory, and the second storage medium is a hard disk. Certainly, in another possible implementation, the first storage medium is a cache, and the second storage medium may be a hard disk, or the like. In this embodiment, a data read/write access rate of the first storage medium is greater than a data read/write access rate of the second storage medium, but specific implementation of the first storage medium and the second storage medium is not limited.

According to a second aspect, this application provides a data prefetch apparatus, where the data prefetch apparatus includes modules configured to perform the data prefetch method according to any one of the first aspect or the possible implementations of the first aspect.

According to a third aspect, this application provides a device, including a processor and a memory, where the memory is configured to store computer instructions, and the processor is configured to perform, according to the computer instructions, an operation step of the data prefetch method according to any one of the first aspect or the possible implementations of the first aspect.

According to a fourth aspect, this application provides a computer-readable storage medium. The computer-readable storage medium stores instructions, and when the instructions are run on a computer, the computer is enabled to perform an operation step of the method according to any one of the first aspect or the possible implementations of the first aspect.

According to a fifth aspect, this application provides a computer program product including instructions. When the computer program product runs on a computer, the computer is enabled to perform an operation step of the method according to any one of the first aspect or the possible implementations of the first aspect.

In this application, based on the implementations according to the foregoing aspects, the implementations may be further combined to provide more implementations.

DESCRIPTION OF EMBODIMENTS

The following describes the technical solutions in this application with reference to accompanying drawings in embodiments of this application.

In an application, data that a processor needs to access may be stored in a storage medium with high read performance, or may be stored in a storage medium with low read performance. Therefore, data in the storage medium with low read performance may be written into the storage medium with high read performance in advance in a data prefetch manner. In this way, when the processor needs to perform data access, the processor may access the data needed by the processor from the storage medium with high read performance, so that data access efficiency of the processor can be improved.

Figure 1:
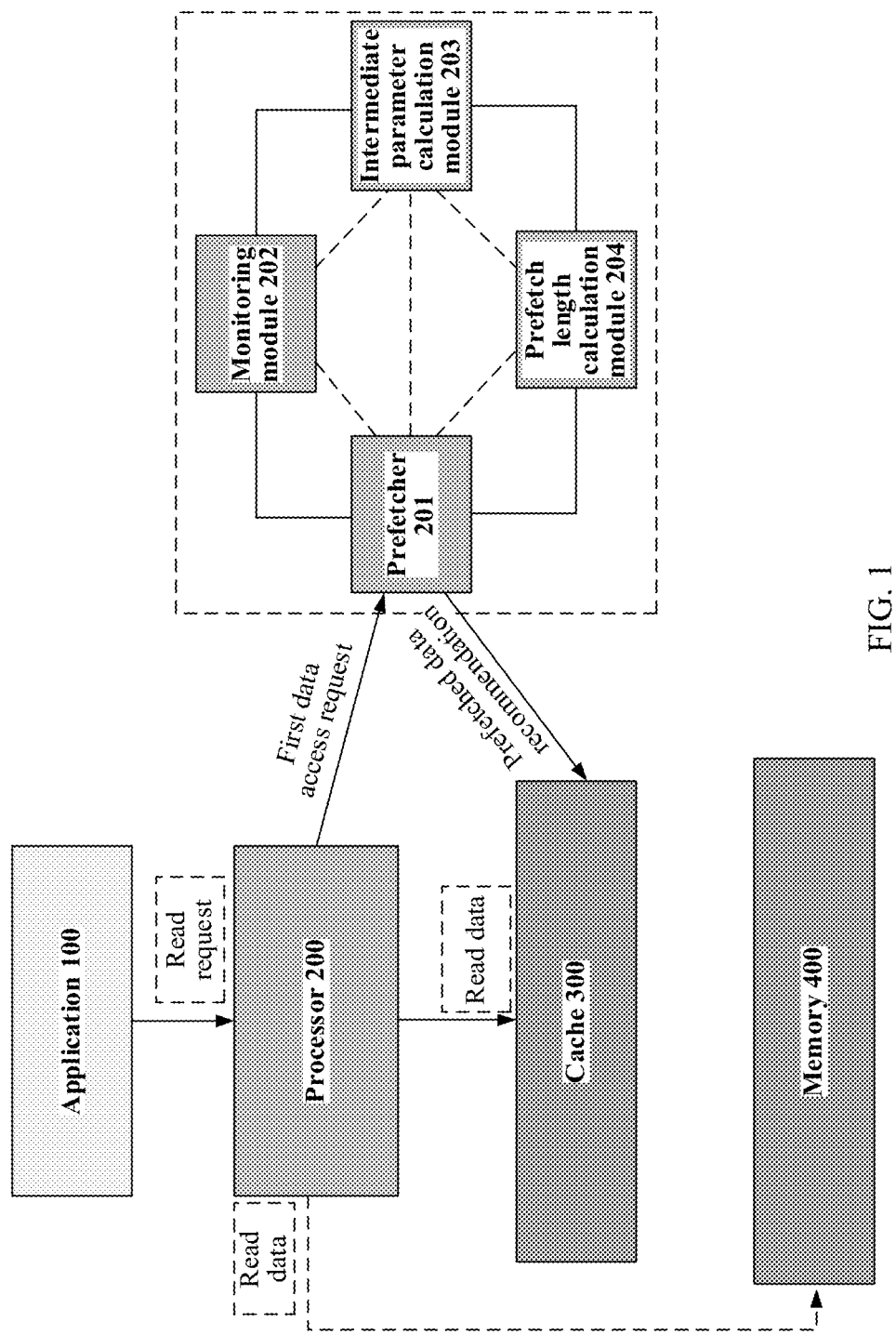
FIG. 1 is a schematic diagram of a system architecture according to this application.

An example in which data in a main memory is prefetched to a cache is used. FIG. 1 is an example of a diagram of a system architecture according to an embodiment of this application. The system includes an application 100, a processor 200, a cache 300, and a main memory 400. The cache 300 and the main memory 400 store data, and a rate at which the processor 200 accesses the data in the cache 300 is usually greater than a rate at which the processor 200 accesses the data in the main memory 400. Correspondingly, in consideration of a factor such as costs in actual application, an amount of data that can be stored in the cache 300 is usually less than an amount of data that can be stored in the main memory 400.

The application 100 may send a data read request to the processor 200 based on a service requirement, to request the processor 200 to feed back corresponding data to the application 100. The processor 200 may first query whether the cache 300 stores the data requested by the application 100. If the cache 300 stores the data requested by the application 100, the processor 200 accesses the corresponding data in the cache 300 and feeds back the data to the application 100. If the cache 300 does not store the data requested by the application 100, the processor 200 may continue to query whether the main memory 400 stores the data requested by the application 100, and feed back the data found in the main memory 400 to the application 100. If the data is not found in the main memory 400, the processor 200 may continue to search a hard disk, or return a search failure to the application 100.

In an application, an amount of data requested by the application 100 may be large. Therefore, the processor 200 may split a data read request delivered by the application 100 into a plurality of data access requests (or referred to as sub-requests of a read input/output (I/O) request or a data access request), process the plurality of data access requests one by one, and access, in the cache 300 or the main memory 400, data requested by each data access request. A size of each data access request obtained through splitting may be the same or may be different, and a size of a data read request after the splitting is not limited in this embodiment. Access addresses (for example, LBAs) of the plurality of data access requests obtained through splitting are consecutive, and the plurality of data access requests with consecutive access addresses may be referred to as a sequential flow. For example, when the application 100 needs to play a single video file of a size of 1024 megabytes (MB), assuming that LBAs of video data of the single video file are consecutive during storage, the application 100 may send 1024 data access requests to the processor 200, and each data access request is used to request the processor 200 to feed back 1 MB video data, in an example, a 1st data access request may be used to request continuous 1 MB video data starting from a start logic address, a 2nd data access request is used to continue to request continuous 1 MB video data starting from a previous end logic address, and so on. In this case, the plurality of data access requests may be referred to as a sequential flow.

Because the rate at which the processor 200 accesses the cache 300 is greater than the rate at which the processor 200 accesses the main memory 400, before the processor 200 performs data access, data that needs to be accessed by the processor 200 may be written from the main memory 400 to the cache 300 in advance. In this way, the processor 200 may access, in the cache 300, the data needed by the processor 200, so that data access efficiency of the processor 200 is implemented.

In a process of prefetching data in the main memory 400 to the cache 300, a prefetcher 201 may predict, based on a previous data access request executed by the processor 200, data that needs to be accessed when the processor 200 executes a next data access request, and recommend the predicted prefetched data to the cache 300, for example, recommend information such as a start storage address and a data length of the prefetched data in the main memory 400 to the cache 300. In this way, the cache 300 may first search data stored in the cache 300, for the prefetched data recommended by the prefetcher 201. If the data stored in the cache 300 includes the prefetched data recommended by the prefetcher 201, the cache 300 may end the prefetch operation, or if the data stored in the cache 300 does not include the prefetched data recommended by the prefetcher 201, the cache 300 may search the main memory 400 for the data, and write the found data into the cache 300. In this way, when executing the next data access request, the processor 200 may directly find, in the cache 300, the data that needs to be accessed by the processor 200, and does not need to search the main memory 400. Certainly, in another implementation, the prefetcher 201 may alternatively access the data in the main memory 400, and prefetch the accessed data to the cache 300.

To resolve a problem in a conventional technology, an embodiment of this application provides a data prefetch method, to avoid as much as possible that excessively much data or excessively little data is prefetched at each time of data prefetch. In an implementation, the prefetcher 201 may calculate a prefetch length for prefetching data for the next data access request based on the previous data access request and a data lifecycle that corresponds to the cache 300, to prefetch a corresponding data set in the main memory 400 to the cache 300 based on the prefetch length. The data lifecycle in the cache 300 may reflect a change status of data in the cache 300. The data lifecycle may reflect an interval at which the data in the cache 300 changes, in other words, may reflect a data change rule in the cache. Therefore, a prefetch length that is for prefetching data at a single time and that is calculated based on the data lifecycle can conform to the data change rule in the cache 300, so that prefetched data of a proper length may be prefetched for the sequential flow in advance. In this way, the prefetch length for prefetching data at a single time is dynamically adjusted in an adaptive manner, so that not only a prefetched data waste and occupation of cache space that are caused by prefetching excessively much data at the single time can be avoided as much as possible, but also performance deterioration of the processor 200 caused by prefetching excessively little data at the single time can be avoided as much as possible.

The prefetcher 201 may be implemented by using software. For example, the prefetcher 201 may be deployed, as a functional module, in the cache 300, to prefetch data in the main memory 400 to the cache 300 in time before the processor 200 performs data access. Certainly, the prefetcher 201 may alternatively be deployed independently of the cache 300, for example, deployed in a physical device in which the processor 200 is located. Optionally, the prefetcher 201 may run in a user mode, to limit a data access capability of the prefetcher 201, for example, limit the prefetcher 201 to accessing data stored in the cache 300.

Optionally, to improve an operation capability of the prefetcher 201, a function of the prefetcher 201 may alternatively be implemented by using separate hardware. The prefetcher 201 may be implemented by using an application-specific integrated circuit (ASIC), or may be implemented by using a programmable logic device (PLD). The PLD may be implemented by using a complex PLD (CPLD), a field-programmable gate array (FPGA), generic array logic (GAL), or any combination thereof.

It should be noted that the system architecture shown in FIG. 1 is merely used as an example, and is not intended to limit a system architecture to which embodiments of this application are applicable to the example shown in FIG. 1. For example, in another possible system architecture, a device such as a hard disk may be further included. The prefetcher 201 may prefetch data in the hard disk to the main memory 400, the cache 300, or the like.

Figure 2:
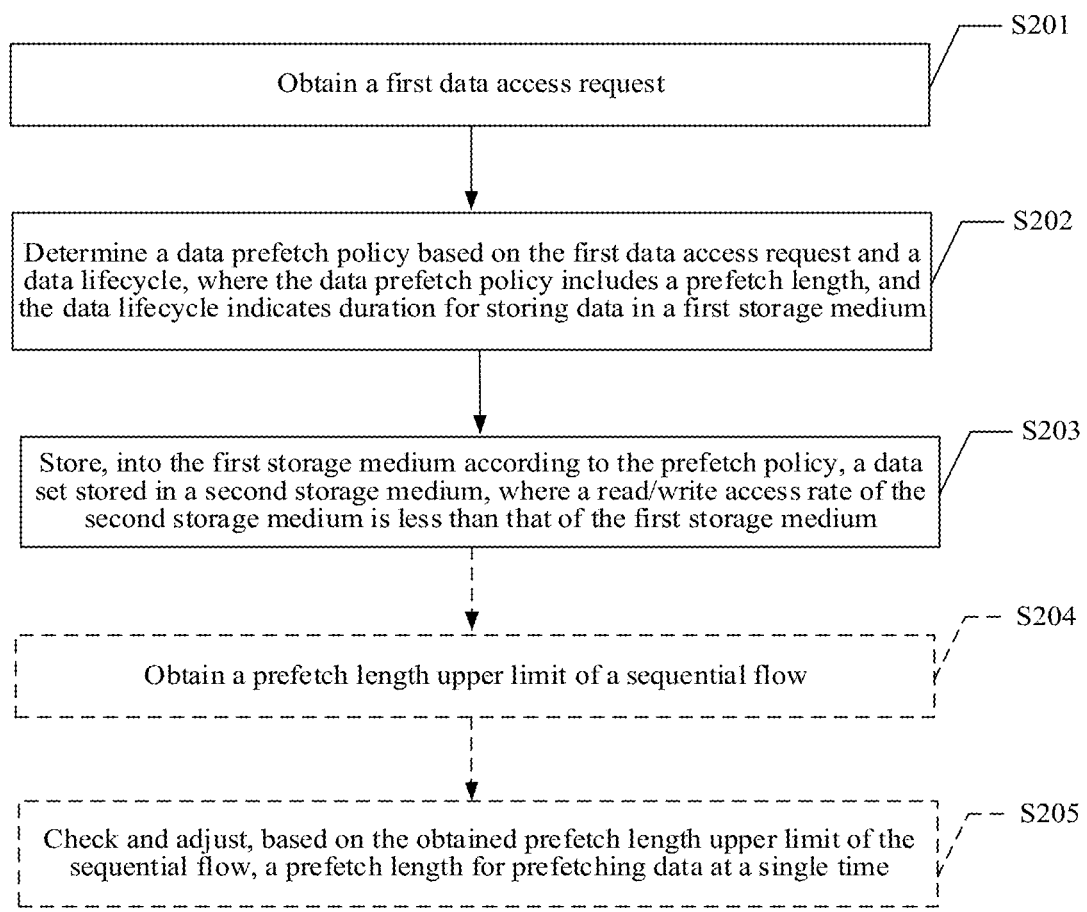
FIG. 2 is a schematic flowchart of a data prefetch method according to an embodiment of this application.

FIG. 2 is a schematic flowchart of a data prefetch method according to an embodiment of this application. The method may be applied to the system architecture shown in FIG. 1, or may be applied to another applicable system architecture. This is not limited in this embodiment. An example in which the data prefetch method is applied to the system architecture shown in FIG. 1 is used. As shown in FIG. 2, the data prefetch method may be performed by the prefetcher 201 in FIG. 1 or a device in which the prefetcher 201 is located. The method includes the following steps.

S201: Obtain a first data access request.

In an application, a sequential flow usually includes a plurality of data access requests, which may be sequentially executed by a processor 200. When executing each data access request, the processor 200 may send the data access request that is being executed to the prefetcher 201 (for ease of description, the data access request is referred to as a first data access request below), so that the prefetcher 201 predicts, based on the first data access request that is being executed by the processor 200, data that needs to be accessed when the processor 200 executes a next data access request of the sequential flow, and prefetches the data stored in a second storage medium (which may be, for example, the main memory 400 in FIG. 1) to a first storage medium (which may be, for example, the cache 300 in FIG. 1) with a higher read/write access rate. In this way, when executing the next data access request, the processor 200 may directly access, from the second storage medium, the data needed by the processor 200, so that a data access rate of the processor 200 can reach a high level.

In actual application, the first storage medium may be a cache, and the second storage medium may be a main memory (such as a synchronous dynamic random-access memory (RAM) or a dynamic RAM) with a low access rate, or may be a hard disk with a lower access rate. Alternatively, the first storage medium may be a main memory, and the second storage medium may be a hard disk with a low access rate, or the like. In this embodiment, a rate at which the processor 200 accesses the first storage medium is greater than a rate at which the processor 200 accesses the second storage medium, and a specific combination manner of the first storage medium and the second storage medium in actual application is not limited in this embodiment.

S202: Determine a data prefetch policy based on the first data access request and a data lifecycle, where the data prefetch policy includes a prefetch length, and the data lifecycle indicates duration for storing data in the first storage medium.

The prefetch length for prefetching data in the determined data prefetch policy may be determined based on the data lifecycle in the first storage medium. Usually, although the first storage medium has high data read/write performance, storage space of the first storage medium is usually small. Therefore, it is usually difficult to store data in the first storage medium for a long time. After duration that the data stays in the first storage medium reaches preset duration, the data may be eliminated. In this case, the first storage medium no longer stores the data. Correspondingly, duration for storing data in the first storage medium is a lifecycle of the data. The lifecycle may reflect a change status of the data in the first storage medium. A change of the data is related to prefetched data written into the first storage medium. There-fore, the prefetcher 201 may calculate, based on the data lifecycle, a prefetch length for prefetching data at a single time.

In an example of determining a prefetch length, there may be a mapping relationship between a data lifecycle corresponding to the first storage medium and a prefetch length for prefetching data at a single time. The mapping relationship may be established by collecting statistics on a data lifecycle of prefetched data of the first storage medium in a historical time period and an optimal prefetch length corresponding to the prefetched data in the historical time period. Prefetching data for a sequential flow in the historical time period based on the optimal prefetch length may enable as much as possible the prefetched data in the historical time period to have no prefetch waste or no insufficient prefetch, or have a minimum amount of data with a prefetch waste and insufficient prefetch. In this way, after obtaining a current data lifecycle in the second storage medium, the prefetcher 201 may find, based on the mapping relationship, a prefetch length that is for prefetching data at a single time and that corresponds to the data lifecycle.

The data lifecycle of the data in the first storage medium may be determined through data statistics collection or calculation.

Further, when the data lifecycle is determined through data statistics collection, the prefetcher 201 may collect statistics on a lifecycle of a second data set in a preset time period in the first storage medium, and calculate an average value of a lifecycle of at least one piece of data in the second data set in the preset time period, so that the calculated average value may be used as the current data lifecycle corresponding to the first storage medium. Optionally, the current data lifecycle corresponding to the first storage medium may alternatively be obtained by performing function fitting or the like on a data lifecycle in a preset time period. This is not limited in this embodiment. The preset time period may be, for example, a past time period, such as one hour closest to a current moment.

In an implementation, the system architecture shown in FIG. 1 may further include a monitoring module 202 and an intermediate parameter calculation module 203. The monitoring module 202 may be configured to monitor data stored in the first storage medium, so that a data lifecycle that is in a historical time period and whose statistics are collected by the prefetcher 201 may be provided by the monitoring module 202. Further, the system architecture shown in FIG. 1 further includes the intermediate parameter calculation module 203, and the foregoing calculation process performed by the prefetcher 201 for a data lifecycle in a historical time period may be completed by the intermediate parameter calculation module 203. Further, the monitoring module 202 may provide, to the intermediate parameter calculation module 203, data lifecycles that are in a plurality of historical time periods and that are obtained through monitoring, and the intermediate parameter calculation module 203 calculates an average value of the data lifecycles in the plurality of historical time periods. In this way, the prefetcher 201 may obtain, from the intermediate parameter calculation module 203, the data lifecycle in the first storage medium (that is, the average value calculated by the intermediate parameter calculation module 203). In this way, computing pressure of the prefetcher 201 can be alleviated, and a computing performance requirement on the prefetcher 201 can be reduced.

When the data lifecycle is determined through data calculation, the prefetcher 201 may obtain a capacity of the first storage medium and data write bandwidth that is of the first storage medium and that is at a current moment, so that the data lifecycle corresponding to the first storage medium may be calculated based on the capacity and the data write bandwidth of the first storage medium. For example, a ratio of the capacity of the first storage medium to the data write bandwidth may be used as the data lifecycle corresponding to the first storage medium. Certainly, a specific implementation of obtaining a data lifecycle is not limited to the foregoing example. This is not limited in this embodiment.

In actual application, data access requests included in a same sequential flow may be different. For example, amounts of data requested by different data access requests in a same sequential flow are different. Therefore, when determining, for a sequential flow, a length for prefetching data at a single time, the prefetcher 201 may further determine the length with reference to a data lifecycle and an attribute of the sequential flow.

In a possible implementation, the attribute of the sequential flow may be an average data access length(S) of a plurality of data access requests included in the sequential flow and duration (t) that the sequential flow has lasted, so that the prefetcher 201 may obtain S and t, and calculate, for the sequential flow according to the following formula (1), a prefetch length (P) for prefetching data at a single time. The average data access length(S) may be obtained through summing and then averaging of lengths of data requested to be accessed by using the plurality of data access requests respectively. The duration (t) that the sequential flow has lasted is a sum of duration that a plurality of data access requests that have been currently executed last respectively.

$$P = T * \frac{S}{t}. \tag{1}$$

Optionally, the prefetch length (P) for prefetching data at a single time may alternatively be calculated by another module/device (for example, a prefetch length calculation module 204 in the system architecture shown in FIG. 1). For example, the monitoring module 202 may monitor duration that a sequential flow has lasted and a length of data accessed by the processor 200 when the processor 200 executes each data access request of the sequential flow, and provide a plurality of data lengths obtained through monitoring to the intermediate parameter calculation module 203, so that the intermediate parameter calculation module 203 calculates an average data access length(S) of the plurality of data access requests. In addition, the monitoring module 202 provides the duration (t) that the sequential flow has lasted and that is obtained through monitoring to the prefetch length calculation module 204. Then, the prefetch length calculation module 204 may calculate, according to the formula (1) based on S calculated by the intermediate parameter calculation module 203 and t provided by the monitoring module 202, the prefetch length (P) for prefetching data at a single time. In this way, the prefetcher 201 may directly obtain, from the prefetch length calculation module 204, the prefetch length (P) for prefetching data at a single time.

In the system architecture shown in FIG. 1, an example in which the monitoring module 202, the intermediate parameter calculation module 203, and the prefetch length calculation module 204 are independent of the prefetcher 201 is used for description. In actual application, these modules (or some modules) may alternatively be integrated into the prefetcher 201, so that functions such as monitoring and calculation performed by the monitoring module 202, the intermediate parameter calculation module 203, and the prefetch length calculation module 204 may alternatively be implemented by the prefetcher 201. For example, the prefetcher 201 completes the foregoing process of calculating a value of P.

It should be noted that the foregoing process of calculating a value of P is merely used as an implementation example. In another possible implementation, the prefetcher 201 may alternatively calculate, in another manner and based on an attribute of a sequential flow and a data lifecycle, a prefetch length for prefetching data at a single time. This is not limited in this embodiment.

S203: Store, into the first storage medium according to the prefetch policy, a data set stored in the second storage medium, where a read/write access rate of the second storage medium is less than that of the first storage medium.

When determining a prefetched data set, the prefetcher 201 may parse out, based on the first data access request sent by the processor 200, information such as a logic start address and a data length of accessed data in the second storage medium. In this way, the prefetcher 201 may determine a logic end address of the accessed data in the second storage medium based on the logic address and the data length that are parsed out (certainly, if this part of data has been prefetched to the first storage medium by the prefetcher before, the processor 200 may directly access this part of data from the first storage medium). Because a plurality of data access requests included in a sequential flow are usually used to access data with consecutive logic addresses in the second storage medium, the prefetcher 201 may locate a start storage location of prefetched data for a next data access request (referred to as a second data access request below) of the sequential flow. The start storage location may be, for example, the foregoing logic end address. In this way, after determining a prefetch length for prefetching data, the prefetcher 201 may write a data set (namely, the prefetched data) of the prefetch length after the logic end address in the second storage medium into the first storage medium, or recommend the data set to the first storage medium, so that the first storage medium actively pulls the data set from the second storage medium. For example, the data prefetch policy determined by the prefetcher 201 may further indicate the data set.

Further, a process in which the prefetcher 201 determines a prefetched data set and writes the data set from the second storage medium to the first storage medium needs to consume time, and in this process, the processor 200 may have completed execution of a first data access request and start to execute a second data access request. Therefore, before the processor 200 accesses data in the first storage medium based on the second data access request, the prefetcher 201 may have not prefetched the data to the first storage medium in time (that is, a fake hit of prefetch occurs), and therefore the processor 200 may need to access the data from the second storage medium. In this case, after the data accessed by the processor 200 from the second storage medium is prefetched to the first storage medium, a prefetch waste occurs in the data. Based on this, in some possible implementations, when determining to prefetch data, the prefetcher 201 may adjust a start storage location of a prefetched data set in the second storage medium. For example, the prefetcher 201 may determine, based on a first data access request, that a logic end address of data accessed by the processor 200 in the second storage medium is 0x6000000. If the prefetcher 201 prefetches data from 0x6000001, data at a plurality of logic addresses such as 0x6000001 may not be written into the first storage medium in time. Therefore, this part of data may not be accessed by the processor 200 in an entire data lifecycle (the processor 200 has accessed this part of data from the second storage medium). Consequently, this part of data wastes a storage resource of the first storage medium, and a fake hit of prefetch occurs. Therefore, the prefetcher 201 may prefetch a data set from 0x6001000 (or another logic address), and write the data set into the first storage medium. In this case, the processor 200 may access data from 0x6000001 to 0x6000111 from the second storage medium, and can access data at and after 0x6001000 from the first storage medium. In this way, it can be avoided that the data from 0x6000001 to 0x6000111 is not accessed by the processor 200 because the data is not written into the first storage medium in time, and consequently a prefetched data waste and occupation of storage space of the first storage medium are caused.

For example, the prefetcher 201 may adjust a start storage location of prefetched data based on data access time of a first data access request. For example, the prefetcher 201 may further parse out information such as the data access time from the first data access request, to determine an adjusted start storage location of the prefetched data based on the data access time and a current moment. For example, a larger time interval between the current moment and the data access time indicates a larger interval between the start storage locations before and after the adjustment. Certainly, the adjusted start storage location of the prefetched data may alternatively be determined in another manner. This is not limited in this embodiment.

In this embodiment, not only a prefetch length for prefetching data at a single time may be determined for a sequential flow in the foregoing process, but also a total prefetch length for prefetching data, namely, a sum of a plurality of prefetch lengths for prefetching data at a single time, may be further determined for the sequential flow. For example, a data prefetch policy determined based on a first data access request and a data lifecycle may further include a prefetch length upper limit of the sequential flow. In this way, it can be avoided as much as possible that a prefetch waste is caused because a total amount of data prefetched for the sequential flow is excessively large or an amount of prefetched data is insufficient.

For this reason, this embodiment may further include the following steps.

S204: Obtain a prefetch length upper limit of the sequential flow.

In a possible implementation, the prefetcher 201 may obtain a prefetch length base ($L_{base}$) and an accessed data length A of the sequential flow. The accessed data length A of the sequential flow is a sum of lengths of data that is respectively requested to be accessed by using a plurality of data access requests that have been executed and that are included in the sequential flow. In this way, the prefetch length upper limit L corresponding to the sequential flow may be calculated based on $L_{base}$ and A, in other words, a maximum amount of data prefetched for the sequential flow is calculated. For example, L may be calculated according to the following formula (2) and formula (3):

$$N = \left\lceil \frac{A}{L_{base}} \right\rceil, \text{ and} \tag{2}$$

$$L = L_{base} * N. \tag{3}$$

N is obtained by rounding up a ratio of A to $L_{base}$. When the ratio of A to $L_{base}$ is within an interval [0,1], the prefetch length upper limit of the sequential flow is $L_{base}$, when the ratio of A to $L_{base}$ is within an interval (1,2], the prefetch length upper limit of the sequential flow is $2L_{base}$, when the ratio of A to $L_{base}$ is within an interval (2,3], the prefetch length upper limit of the sequential flow is $3L_{base}$, or the like. In another implementation, the prefetcher 201 may alternatively calculate L by using the intermediate parameter calculation module 203 in FIG. 1, or the like.

In an example, a value of $L_{base}$ may be calculated based on an accessed data length of the sequential flow in a historical time period.

Further, the monitoring module 202 may obtain a plurality of historical time windows through division based on a preset time granularity (for example, duration of 10 seconds). Assuming that a current moment is 10:00:50, the monitoring module may obtain a historical time window from 10:00:40 to 10:00:50, a historical time window from 10:00:30 to 10:00:40, a historical time window from 10:00:20 to 10:00:30, a historical time window from 10:00:10 to 10:00:20, a historical time window from 10:00:00 to 10:00:10, and the like through division based on a time granularity of 10 seconds, and obtain lengths of data finally accessed by using a plurality of sequential flows in each historical time window. Then, the intermediate parameter calculation module 203 may calculate the prefetch length base $L_{base}$ according to the following formula (4) and formula (5):

$$\text{Waste}(x) = \sum_{i=1}^{n} \left( \text{mod}\left( \left\lceil \frac{Li}{x} \right\rceil * x \right), Li \right), \text{ and} \tag{4}$$

$$L_{base} = \text{argminWaste}(x). \tag{5}$$

Li is a length of an $i^{th}$ sequential flow counted in a historical time window, n is a quantity of sequential flows included in the historical time window, x is a to-be-calculated length base $L_{base}$, and Waste(x) is a waste value of prefetched data. $L_{base}$ calculated according to the formula (4) and the formula (5) can minimize a total amount of prefetched data wasted by prefetching data in the second storage medium for a sequential flow in the historical time window based on the $L_{base}$.

The intermediate parameter calculation module 203 may calculate one piece of $L_{base}$ for each historical time window, and determine final $L_{base}$ based on the plurality of pieces of calculated $L_{base}$. For example, the intermediate parameter calculation module 203 may use, as final Lbase, Lbase that is greater than a first preset value and whose corresponding Waste(x) is less than a second preset value, or may use an average value of the plurality of pieces of Lbase as final Lbase, or may use, as final Lbase through voting, Lbase whose quantity is the largest in the plurality of pieces of Lbase.

However, in another example, a length of data accessed by using a sequential flow in each historical time window may alternatively be obtained through statistics collection, and a data access length with a largest quantity of occurrences is used as a value of Lbase, or the like. Alternatively, a value of Lbase may be an empirical value, and preset in the prefetcher 201 by a skilled person. In this embodiment, how to determine the value of Lbase is not limited.

Correspondingly, the prefetch length upper limit of the sequential flow may be calculated in the foregoing process, may be an empirical value, and preset by a skilled person, or the like. In this embodiment, how to determine the prefetch length upper limit of the sequential flow is not limited.

S205: Check and adjust, based on the obtained prefetch length upper limit of the sequential flow, the prefetch length for prefetching data at a single time.

In this embodiment, after the prefetch length upper limit L for prefetching data is calculated for the sequential flow based on Lbase and A, the prefetch length P for prefetching data at a single time may be further checked and adjusted by using L. Further, after determining the prefetch length P of the data set, the prefetcher 201 may calculate a difference between the prefetch length upper limit L of the sequential flow and a length $L_{history}$ of data that has been prefetched, and compare whether the calculated prefetch length P for prefetching data at a single time is greater than the difference. If the calculated prefetch length P for prefetching data at a single time is not greater than the difference, the corresponding data set may be prefetched from the second storage medium to the first storage medium based on a value of calculated P. If the calculated prefetch length P for prefetching data at a single time is greater than the difference, it indicates that after data is prefetched by using the value of calculated P, a total length of prefetched data for the sequential flow exceeds the prefetch length upper limit L. In this case, the prefetcher 201 may reduce a value of the prefetch length P for prefetching data at this time, and further may adjust the currently calculated prefetch length P to a difference between the prefetch length upper limit L of the sequential flow and the length $L_{history}$ of the data that has been prefetched, so that P, $L_{history}$, and L satisfy the following formula (6):

$$L_{history} + P \leq L. \quad (6)$$

Through the foregoing check and adjustment of the value of P, a prefetch waste caused by an excessive amount of data prefetched for the sequential flow can be avoided as much as possible.

In this embodiment, after the prefetch length P or prefetching data at a single time is calculated, data may be prefetched for the sequential flow based on the prefetch length P each time subsequently. Certainly, in some implementations, the value of the prefetch length P for prefetching data at a single time may be recalculated each time, or the prefetch length P for prefetching data at a previous time may be correspondingly adjusted, and an adjusted prefetch length P is used as the prefetch length for prefetching data at this time.

For example, in actual application, an attribute of a sequential flow may change continuously. For example, duration (t) that the sequential flow has lasted gradually increases, and an average data access length(S) of a plurality of data access requests that have been executed by the processor 200 fluctuates. Therefore, when a prefetch length P for prefetching data at a single time is calculated for the sequential flow based on the attribute of the sequential flow, the prefetcher 201 may recalculate a new value of the prefetch length P based on a changed attribute, and prefetch corresponding data by using the new calculated value of the prefetch length P. Alternatively, the prefetcher 201 may adjust a value of the prefetch length P for prefetching data at a previous time, and use an adjusted value of the prefetch length P as a prefetch length for prefetching data at this time, for example, may correspondingly increase or decrease, based on a change rate of an S/t value, the value of the prefetch length P for prefetching data at a previous time.

In this embodiment, based on a data lifecycle, an interval at which data in the first storage medium changes once may be reflected. In other words, the data lifecycle may reflect a data change rule in the first storage medium. Therefore, a prefetch length calculated based on the data lifecycle can conform to the data change rule in the first storage medium, and data of a proper length may be prefetched to the first storage medium in advance for a next data access request. In this way, a prefetch length for prefetching data at a single time is dynamically adjusted in an adaptive manner, so that not only a prefetched data waste and occupation of storage space of the first storage medium that are caused by prefetching excessively much data at the single time can be avoided as much as possible, but also low data access performance caused by prefetching excessively little data at the single time can be avoided as much as possible.

It should be noted that, for ease of description, the foregoing method embodiment is represented as a combination of a series of actions. However, a person skilled in the art should appreciate that this application is not limited to the described sequence of the actions.

Another appropriate step combination that can be figured out by a person skilled in the art based on the content described above also falls within the protection scope of this application. In addition, a person skilled in the art should also appreciate that all embodiments described in this specification are preferred embodiments, and the related actions are not necessarily mandatory to this application.

Figure 3:
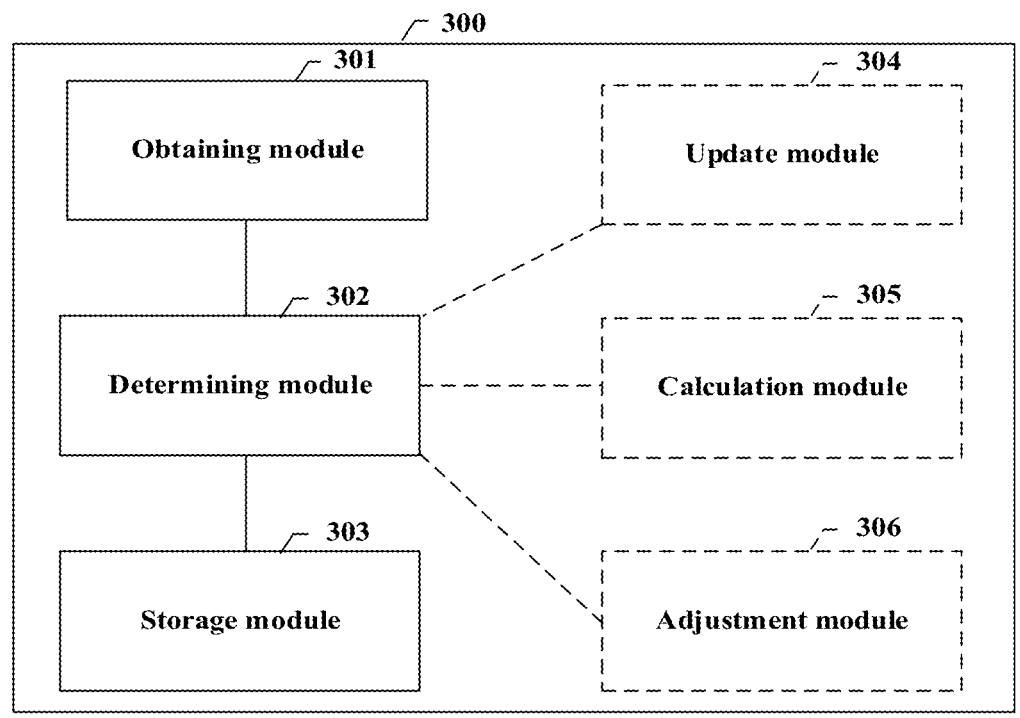
FIG. 3 is a schematic diagram of a structure of a data prefetch apparatus according to this application.
Figure 4:
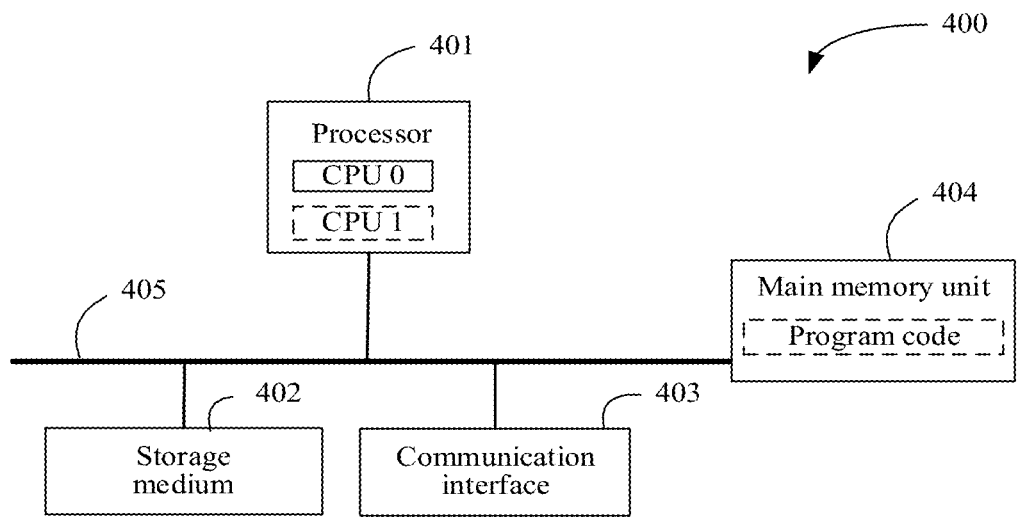
FIG. 4 is a schematic diagram of a hardware structure of a device according to this application.

With reference to FIG. 1 and FIG. 2, the foregoing describes in detail the data prefetch method provided in this application. With reference to FIG. 3 and FIG. 4, the following describes a data prefetch apparatus and a device that are provided in this application.

FIG. 3 is a schematic diagram of a structure of a data prefetch apparatus according to this application. The apparatus 300 may include an obtaining module 301 configured to obtain a first data access request, a determining module 302 configured to determine a data prefetch policy based on the first data access request and a data lifecycle, where the data prefetch policy includes a prefetch length, and the data lifecycle indicates duration for storing data in a first storage medium, and a storage module 303 configured to store, into the first storage medium according to the prefetch policy, a first data set stored in a second storage medium, where a read/write access rate of the second storage medium is less than that of the first storage medium, and the first data set includes at least one piece of data.

It should be understood that the apparatus 300 in this embodiment of this application may be implemented by using an ASIC, or may be implemented by using a PLD. The PLD may be a CPLD, an FPGA, GAL, or any combination thereof. Alternatively, when the data prefetch method shown in FIG. 2 may be implemented by using software, the apparatus 300 and modules of the apparatus 300 may be software modules.

In a possible implementation, the determining module 302 is further configured to determine the data prefetch policy based on the first data access request, the data lifecycle, and an attribute of a sequential flow to which the first data access request belongs, where the sequential flow includes a plurality of data access requests with consecutive LBAs, and the first data access request is any one of the plurality of data access requests with consecutive LBAs. The attribute of the sequential flow includes an average data access length of the plurality of data access requests and duration that the sequential flow has lasted.

In a possible implementation, the determining module 302 is further configured to determine a start storage location of the data set in the second storage medium based on the first data access request, and calculate a prefetch length of the data set based on the data lifecycle, where the data set includes data of the prefetch length starting from the start storage location in the second storage medium.

In a possible implementation, the obtaining module 301 is further configured to, before the first data set stored in the second storage medium is stored into the first storage medium according to the prefetch policy, obtain a prefetch length upper limit, and obtain a prefetched length of the sequential flow.

The apparatus 300 further includes an update module 304 configured to, when the prefetch length is greater than a difference between the prefetch length upper limit and the prefetched length, update the prefetch length to the difference.

In a possible implementation, the apparatus 300 further includes a calculation module 305 configured to calculate the prefetch length upper limit of the sequential flow based on an accessed data length of the sequential flow and a prefetch length base.

In a possible implementation, the calculation module 305 is further configured to calculate the prefetch length base based on accessed data lengths of a plurality of sequential flows in a historical time period, where when data is prefetched to the first storage medium for the plurality of sequential flows in the historical time period based on the prefetch length base, a total amount of data wasted by prefetching data is the minimum.

In a possible implementation, the apparatus 300 further includes an adjustment module 306 configured to, when an attribute value of the sequential flow changes, adjust the prefetch length by using a changed attribute value.

In a possible implementation, the data lifecycle is determined based on an average value of storage duration of a second data set in the first storage medium in a preset time period, and the second data set includes at least one piece of data.

In a possible implementation, the obtaining module 301 is further configured to obtain a capacity of the first storage medium and data write bandwidth of the first storage medium.

The apparatus 300 further includes the calculation module 305 configured to calculate the data lifecycle based on the capacity of the first storage medium and the data write bandwidth.

In a possible implementation, the first storage medium is a cache, and the second storage medium is a main memory, or the first storage medium is a main memory, and the second storage medium is a hard disk.

The apparatus 300 according to this embodiment of this application may correspondingly perform the method described in embodiments of this application. In addition, the foregoing and other operations and/or functions of the units in the apparatus 300 are separately used to implement a corresponding procedure of the method in FIG. 2. For brevity, details are not described herein again.

FIG. 4 is a schematic diagram of a device 400 according to this application. As shown in the figure, the device 400 includes a processor 401, a storage medium 402, a communication interface 403, and a main memory unit 404. The processor 401, the storage medium 402, the communication interface 403, and the main memory unit 404 communicate with each other through a bus 405, or may communicate with each other through another means. The storage medium 402 is configured to store instructions, and the processor 401 is configured to execute the instructions stored in the storage medium 402. The storage medium 402 stores program code, and the processor 401 may invoke the program code stored in the storage medium 402 to perform the following operations: obtaining a first data access request, determining a data prefetch policy based on the first data access request and a data lifecycle, where the data prefetch policy includes a prefetch length, and the data lifecycle indicates duration for storing data in a first storage medium, and storing, into the first storage medium according to the prefetch policy, a first data set stored in a second storage medium, where a read/write access rate of the second storage medium is less than that of the first storage medium, and the first data set includes at least one piece of data.

It should be understood that, in this embodiment of this application, the processor 401 may be a CPU, or the processor 401 may be another general-purpose processor, a digital signal processor (DSP), an ASIC, an FPGA or another PLD, a discrete gate or transistor logic device, a discrete device component, or the like. The general-purpose processor may be a microprocessor or any conventional processor.

The storage medium 402 may include a read-only memory (ROM) and a RAM, and provide instructions and data for the processor 401. The memory 402 may further include a nonvolatile random access memory. For example, the memory 402 may further store information about a device type.

The storage medium 402 may be a volatile memory or a nonvolatile memory, or may include both a volatile memory and a nonvolatile memory. The nonvolatile memory may be a ROM, a programmable ROM (PROM), an erasable PROM (EPROM), an electrically EPROM (EEPROM), or a flash memory. The volatile memory may be a RAM, and is used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

The communication interface 403 is configured to communicate with another device connected to the device 400. For example, the device 400 may obtain the first data access request through the communication interface 403. The bus 405 may further include a power bus, a control bus, a status signal bus, and the like, in addition to a data bus. However, for clear description, various types of buses in the figure are marked as the bus 405.

It should be understood that, the device 400 according to embodiments of this application may correspond to the apparatus 300 in embodiments of this application, and may correspond to a corresponding subject in the method shown in FIG. 2 in embodiments of this application, and the foregoing and other operations and/or functions of the modules in the device 400 are separately used to implement a corresponding procedure of the method in FIG. 2. For brevity, details are not described herein again.

In addition, this application further provides a device. The device may include the device 400 shown in FIG. 4, and the device may implement a corresponding procedure of the method in FIG. 2. For brevity, details are not described herein again.

In addition, this application further provides a computer program product, and the computer program product includes one or more computer instructions. When the computer program instructions are loaded and executed on a computer, procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium in which the computer can perform storage, or a data storage device, such as a training device or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner that is used when objects having a same attribute are described in embodiments of this application.

In addition, it should be noted that the apparatus embodiments described above are merely examples. The units described as separate parts may or may not be physically separate, and parts displayed as units may or may not be physical units, in other words, may be located in one position, or may be distributed on a plurality of network units. Some or all modules thereof may be selected based on an actual need, to achieve the objectives of the solutions in this application. In addition, in the accompanying drawings of the apparatuses provided in this application, a connection relationship between modules indicates that the modules have a communication connection with each other, which may be further implemented as one or more communication buses or signal cables.

The foregoing descriptions are merely examples of implementations of this application, but the protection scope of this application is not limited thereto. Any skilled person familiar with the technical field can readily figure out, in the technical scope disclosed by this application, various equivalent modifications or replacements, and these modifications or replacements shall all fall within the protection scope of this application. Therefore, the protection scope of this application shall be subject to the protection scope of the claims.

What is claimed is:

1. A data prefetch method comprising:
   obtaining a first data access request;
   determining a data prefetch policy based on the first data access request and a data lifecycle, wherein the data prefetch policy comprises a first prefetch length, and wherein the data lifecycle indicates a first duration for storing data in a first storage medium; and
   storing, into the first storage medium according to the data prefetch policy, a first data set stored in a second storage medium,
   wherein a second read/write access rate of the second storage medium is less than a first read/write access rate of the first storage medium, and
   wherein the first data set comprises at least one piece of first data.

2. The prefetch method of claim 1, wherein determining the data prefetch policy comprises determining the data prefetch policy based on an attribute of a sequential flow to which the first data access request belongs, wherein the sequential flow comprises a plurality of data access requests with consecutive logic block addresses (LBAs), wherein the first data access request is any one of the data access requests, and wherein the attribute comprises an average data access length of the data access requests and a second duration that the sequential flow has lasted.

3. The data prefetch method of claim 2, wherein determining the data prefetch policy comprises:
   determining a start storage location of the first data set based on the first data access request; and
   calculating the prefetch length of the first data set based on the data lifecycle, wherein the first data set comprises data of the second prefetch length starting from the start storage location in the second storage medium.

4. The data prefetch method of claim 1, wherein before storing the first data set, the data prefetch method further comprises:
   obtaining a prefetch length upper limit;
   obtaining a prefetched length of a sequential flow to which the first data access request belongs; and
   updating the first prefetch length to a difference between the prefetch length upper limit and the prefetched length when the first prefetch length is greater than the difference.

5. The data prefetch method of claim 4, wherein obtaining the prefetch upper limit further comprises: calculating the prefetch length upper limit based on an accessed data length of the sequential flow and a prefetch length base.

6. The data prefetch method of claim 5, further comprising:
   calculating the prefetch length base based on accessed data lengths of a plurality of sequential flows in a historical time period;
   data to the first storage medium for the of sequential flows in the historical time period based on the prefetch length base.

7. The data prefetch method of claim 2, further comprising adjusting the first prefetch length using a changed attribute value when an attribute value of the sequential flow is changed.

8. The data prefetch method of claim 1, further comprising determining the data lifecycle based on an average value of a storage duration of a second data set in the first storage medium in a preset time period, and wherein the second data set comprises at least one piece of second data.

9. The data prefetch method of claim 1, further comprising:
   obtaining a capacity of the first storage medium and data write bandwidth of the first storage medium; and
   calculating the data lifecycle based on the capacity and the data write bandwidth.

10. A device, comprising:
    a memory configured to store computer instructions; and
    a processor coupled to the memory and configured to execute the instructions to cause the device to:
      obtain a first data access request;
      determine a data prefetch policy based on the first data access request and a data lifecycle, wherein the data prefetch policy comprises a first prefetch length, and wherein the data lifecycle indicates a first duration for storing data in a first storage medium; and store, into the first storage medium according to the data prefetch policy, a first data set stored in a second storage medium,
wherein a read/write access rate of the second storage medium is less than a first read/write access rate of the first storage medium, and
wherein the first data set comprises at least one piece of first data.

11. The device of claim 10, wherein the processor is further configured to execute the instructions to cause the device to determine the data prefetch policy based on an attribute of a sequential flow to which the first data access request belongs, wherein the sequential flow comprises a plurality of data access requests with consecutive logic block addresses (LBAs), wherein the first data access request is any one of the data access requests, and wherein the attribute comprises an average data access length of the data access requests and a second duration that the sequential flow has lasted.

12. The device of claim 11, wherein the processor is further configured to execute the instructions to cause the device to:
determine a start storage location of the first data set based on the first data access request; and
calculate the prefetch length of the first data set based on the data lifecycle, wherein the first data set comprises data of the second prefetch length starting from the start storage location in the second storage medium.

13. The device according of claim 10, wherein before storing the first data set the processor is further configured to execute the instructions to cause the device to:
obtain a prefetch length upper limit;
obtain a prefetched length of a sequential flow to which the data access request belongs; and
update the first prefetch length to a difference between the prefetch length upper limit and the prefetched length when the first prefetch length is greater than the difference.

14. The device of claim 13, wherein the processor is further configured to execute the instructions to cause the device to calculate the prefetch length upper limit based on an accessed data length of the sequential flow and a prefetch length base.

15. The device of claim 14, wherein the processor is further configured to execute the instructions to cause the device to:
calculate the prefetch length base based on accessed data lengths of a plurality of sequential flows in a historical time period; and
prefetched to the first storage medium for the sequential flows in the historical time period based on the prefetch length base.

16. The device of claim 11, wherein the processor is further configured to execute the instructions to cause the device to adjust the first prefetch length using a changed attribute value when an attribute value of the sequential flow is changed.

17. The device of claim 10, wherein the processor further configured to execute the instructions to cause the device to determine the data lifecycle based on an average value of storage duration of a second data set in the first storage medium in a preset time period, and wherein the second data set comprises at least one piece of second data.

18. The device of claim 10, wherein the processor is further configured to execute the instructions to cause the device to:
obtain a capacity of the first storage medium and data write bandwidth of the first storage medium; and
calculate the data lifecycle based on the capacity and the data write bandwidth.

19. The device of claim 10, wherein the first storage medium is a cache and the second storage medium is a main memory, or wherein the first storage medium is the main memory and the second storage medium is a hard disk.

20. A computer program product comprising computer-executable instructions that are stored on a computer-readable storage medium and that, when executed by a processor cause a device to:
obtain a first data access request;
determine a data prefetch policy based on the first data access request and a data lifecycle, wherein the data prefetch policy comprises a prefetch length, and wherein the data lifecycle indicates a duration for storing data in a first storage medium; and
store, into the first storage medium according to the data prefetch policy, a first data set stored in a second storage medium,
wherein a second read/write access rate of the second storage medium is less than a first read/write access rate of the first storage medium, and
wherein the first data set comprises at least one piece of data.

* * * * *

UNITED STATES PATENT AND TRADEMARK OFFICE
CERTIFICATE OF CORRECTION

PATENT NO. : 12,314,180 B2
APPLICATION NO. : 18/344417
DATED : May 27, 2025
INVENTOR(S) : Haixin Wang et al.

Page 1 of 1

It is certified that error appears in the above-identified patent and that said Letters Patent is hereby corrected as shown below:

In the Claims

Claim 5, Column 18, Line 32: "further comprises: calculating" should read "further comprises calculating"

Claim 6, Column 18, Lines 39-40: "period; data to" should read "period; and prefetching data to"

Claim 10, Column 19, Line 4: "wherein a read/write" should read "wherein a second read/write"

Signed and Sealed this
First Day of July, 2025

Coke Morgan Stewart
*Acting Director of the United States Patent and Trademark Office*